United States Patent
Boulot

(10) Patent No.: US 7,079,047 B2
(45) Date of Patent: Jul. 18, 2006

(54) PRESSURE MEASURING AND INFLATION/DEFLATION CONTROL SYSTEM FOR TIRES

(75) Inventor: Jean-Francis Boulot, Pont du Chateau (FR)

(73) Assignee: Michelin Recherche et Technique S.A. (CH)

( * ) Notice: Subject to any disclaimer, the term of this patent is extended or adjusted under 35 U.S.C. 154(b) by 340 days.

(21) Appl. No.: 10/417,595

(22) Filed: Apr. 17, 2003
(Under 37 CFR 1.47)

(65) Prior Publication Data
US 2003/0234041 A1    Dec. 25, 2003

Related U.S. Application Data

(63) Continuation of application No. PCT/EP01/12165, filed on Oct. 22, 2001.

(30) Foreign Application Priority Data
Oct. 23, 2000  (FR) ................... 00 13774

(51) Int. Cl.
*G08B 21/00* (2006.01)
(52) U.S. Cl. ................ 340/870.16; 73/146.5; 340/870.05; 340/447; 702/138
(58) Field of Classification Search ........... 340/447, 340/870, 870.05, 870.16; 702/138; 73/146.5
See application file for complete search history.

(56) References Cited

U.S. PATENT DOCUMENTS

| | | | |
|---|---|---|---|
| 5,119,066 A | 6/1992 | Ballyns | |
| 5,231,872 A | 8/1993 | Bowler | |
| 5,335,540 A * | 8/1994 | Bowler et al. | 73/146.5 |
| 5,825,286 A * | 10/1998 | Coulthard | 340/447 |
| 6,535,116 B1 * | 3/2003 | Zhou | 340/447 |
| 6,788,192 B1 * | 9/2004 | Shimura | 340/447 |
| 6,794,993 B1 * | 9/2004 | Kessler et al. | 340/870.16 |
| 6,868,358 B1 * | 3/2005 | Brown, Jr. | 702/138 |

* cited by examiner

*Primary Examiner*—Albert K. Wong
(74) *Attorney, Agent, or Firm*—E. Martin Remick; Adam Arnold

(57) ABSTRACT

A pressure measuring and inflation/deflation control system for tires, comprising:
  a pressure sensor,
  a pressure variation detector capable on the one hand of responding in a safety time interval to a substantially significant and rapid variation in the pressure inside the cavity of the tire, and on the other hand of acting on another element cooperating with said detector;
  a management module, capable of receiving and processing informations provided by the pressure sensor on the one hand and on the other hand by the pressure variation detector and capable, on the basis of the information provided by the pressure variation detector, of actuating the shift from a so-called "normal" pressure measuring mode to a so-called "accelerated" measuring mode, or the shift from the "accelerated" mode to the "normal" mode.

26 Claims, 5 Drawing Sheets

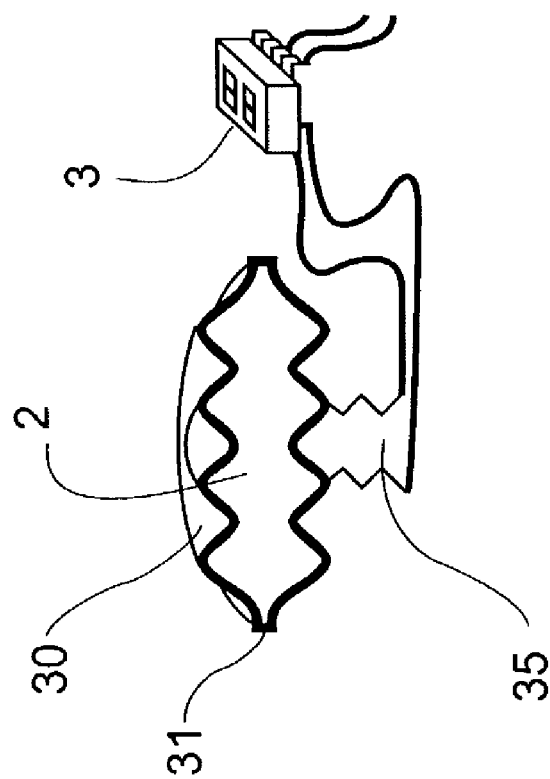
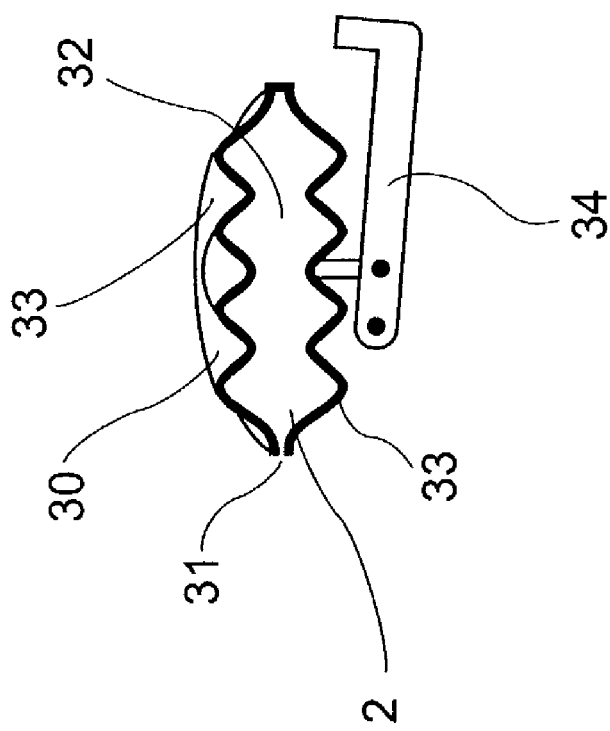
Figure 5a
Figure 5b
Figure 5

PRESSURE MEASURING AND INFLATION/DEFLATION CONTROL SYSTEM FOR TIRES

The present application is a continuation of International Application No. PCT/EP01/12165, filed 22 Oct. 2001, published in French with an English Abstract on 2 May 2002 under PCT Article 21(2), which claims priority to French Patent Application No. FR00/13774, filed 23 Oct. 2000.

BACKGROUND OF THE INVENTION

The present invention relates to a pressure measuring and inflation/deflation control system for tires.

Car and tire manufacturers make ever greater attempts to take account of the constantly increasing demands of modern road users for safety, comfort and convenience. This phenomenon is clear from the commonplace nature of numerous types of device which were virtually non-existent barely a few years ago, such as for example airbags, ABS (anti-lock braking system) brakes, ESP (electronic stability program) devices etc.

More recently, tire pressure measuring and/or monitoring devices have become available. By informing the driver simply, reliably and regularly as to the degree of inflation of the tires of his/her vehicle, an improvement is made to safety, fuel consumption, tire service life etc. Such systems generally comprise at least one pressure sensor of a type known per se.

Thus, certain types of pressure sensor (e.g., capacitive or resistive types) are known, for example, which allow measurement of the pressure of a tire at a given time. In general such sensors require an electrical supply to carry out measurements and transmit the information collected. It is known to equip the wheel with a battery. If it is wished to carry out frequent or even continuous pressure measurements, which is indispensable if it is desired to detect puncture of a tire, the battery has to be easily replaceable, since the sensor makes significant demands on the battery, which becomes rapidly discharged. It has to be possible to effect replacement in a simple, quick and cheap manner.

In such a context, problems of reliability are regularly encountered due to the battery's contacts, which have to withstand the most severe of environments. The contacts deteriorate and the supply of electrical energy risks becoming random or unstable, or even being broken off completely.

To remedy this type of situation, non-replaceable batteries are used, which may be incorporated in definitive manner into the electrical circuit, for example by welding. In this way, a more reliable energy supply is achieved. On the other hand, energy consumption has to be restricted, if the life of the battery is to be prevented from being too short. This comes down to supplying the sensors with power on a discontinuous basis. Pressure measurement may for example be performed by sampling at given time intervals. These time intervals have to be as widely spaced as possible, if it is wished, for example, for the life of the battery to correspond as far as possible to the life of a tire, or even the life of the vehicle. Such a situation is not suitable if it is desired to use the pressure sensor to detect a puncture or any other similar type of situation involving a rapid and significant loss of pressure from a tire. This situation is just as inappropriate if it is desired to effect monitoring for example of inflation or deflation thresholds. Using sampling, for example every 30 or 60 seconds, a possible puncture will be detected solely at the time of the next iteration or measurement, i.e., a certain time after the puncture. However, blow-out detection, to be useful, has to be effected within a very short time, indeed virtually instantaneously. Otherwise, the driver will suffer the consequences of the puncture before being informed thereof. These consequences serve as a warning, and it is often too late to respond, especially if the vehicle is travelling at high speed. In the event of inflation or deflation of one or more tires, it is imperative that the monitoring system respond substantially instantaneously, whether to warn the operator that the required threshold has been reached or alternatively to control automatic stoppage of the inflation/deflation system. The only way of ensuring that accurate monitoring of pressure increase or reduction levels is not indispensable, would be to provide very slow pressure variation rates; the thresholds detected late would not then be exceeded by too much. This would, however, render such operations very long and tedious. Furthermore, during inflation there would be a risk of causing overheating of the compressor, which would be under stress for too long.

SUMMARY OF THE INVENTION

The present invention is directed at proposing a pressure measuring and inflation/deflation control system for tires which allows these drawbacks to be avoided.

In order to do this, the invention proposes a pressure measuring and inflation/deflation control system for tires comprising:

a pressure sensor in fluid communication with the ambient pressure of the tire and capable of measuring this pressure;

a pressure variation detector capable of responding to a variation in pressure inside the cavity of the tire;

a management module, capable of receiving and processing informations provided by the pressure sensor on the one hand and on the other hand by the pressure variation detector and capable, on the basis of the information provided by the pressure variation detector, of actuating the shift from a so-called "normal" pressure measuring mode to a so-called "accelerated" measuring mode, or the shift from the "accelerated" mode to the "normal" mode.

By means of such a system, tire monitoring, in the event of a variation in pressure such as during deliberate inflation or deflation, may either allow an operator to be warned (signal indicating attainment of desired pressure) or even allow inflation/deflation to be stopped automatically. In the first of these instances, the system is advantageously used with an inflation and/or deflation device on the ground (outside the vehicle), while in the second instance, the system is advantageously used with an inflation and/or deflation device located on board the vehicle.

The pressure variation detector or management module is advantageously calibrated so as not to generate a signal in the event of minimal or insignificant variations.

Advantageously, the "accelerated" mode is that in which the time interval between the measurements carried out by the pressure sensor is substantially shorter than in "normal" mode.

The iterations of the accelerated mode must be sufficiently frequent and close together to allow effective detection of the attainment of thresholds or desired pressure values, preferably avoiding the exceeding thereof by significant amounts. The time intervals between measurements are thus adjusted as a function of technical and safety demands.

According to one advantageous example of embodiment of the invention, the "accelerated" mode is that in which the time interval between the measurements effected by the pressure sensor is substantially zero. Of course, technological limits make it difficult to obtain genuinely continuous measurement, but the numerous, close-together iterations allow such functioning to be simulated. In practice, measurements taken every second for example may provide satisfactory results.

In substantially continuous measurement mode, the system allows significant pressure variation rates, making pressure adjustments rapid and effective without loss of inflation level accuracy. Given that the management module actuates transfer to the normal mode as soon as possible, the periods for which the pressure sensor is greatly stressed, i.e., displays greater power consumption, remain substantially restricted. The measurement system and the service life of the battery are thus both optimized.

Advantageously, when the operating mode switches from "economy" to "normal", there is provided a short transitional period of operation in "accelerated" measurement mode, which allows any abnormality in the pressure of one or more tires to be detected very rapidly, or indeed substantially instantaneously.

According to one variant embodiment, the pressure variation detector is capable of providing a signal relating to the rate $\zeta$ of pressure variation in the cavity of the tire.

This type of operation is possible using the types of pressure variation sensor according to the invention.

The pressure variation detector is advantageously of the piezoelectric type, this being a technology which is in itself tried and tested, reliable, accurate and allows very short response times, such as for example of less than 100 ms. Moreover, one of the main characteristics of sensors of the piezoelectric type is that they are able to operate without a power supply. More particularly, deformation of the membrane consisting of a piezoelectric type material allows the generation of a micro-current. This current is then used by a circuit for reading and processing or analysing the signal. Only the electronic module requires a power supply, but a very weak one. A long-life battery may thus be provided.

For example, the pressure variation detector comprises a casing provided with two chambers, insulated substantially from one another and separated by a piezoelectric type membrane, a first chamber being subject to a reference pressure and the second being capable of being in fluid communication with the environment of the medium in which it is desired to effect monitoring, said membrane being deformable under the action of a variation in the pressure of said environment, the deformations thus produced allowing the generation of an electrical signal, the strength of which is related to the degree of deformation.

The reference pressure of the reference chamber is substantially constant and does not change at the time of a variation in the pressure of the environment being monitored, which allows the pressure differential between the chambers to change, this latter variation giving rise to the generation of a piezoelectric type signal.

Advantageously, the membrane is adapted to respond with an amplitude and/or a speed of deformation which is a function of the level and/or rate of pressure variation.

Advantageously, the reference pressure corresponds to a vacuum.

The pressure variation detector is advantageously capable of acting on another element cooperating either electrically or mechanically with said detector.

The signal transmitted by the management module is advantageously of the electrical or radio type.

The sensor is advantageously disposed in such a way that the environment of the medium in which monitoring is performed corresponds to the pressure inside the tire cavity. For example, the sensor may be disposed directly in said cavity; on the other hand, pipes may allow the environment to be forwarded to the sensor disposed for example in the wheel.

According to another advantageous example of embodiment, the pressure variation detector is of the aneroid type.

This technology is simple, reliable, cheap and does not require a large electrical supply to operate. In particular, the aneroid capsule does not require any power supply; only the electronic module requires such a power supply, but a very weak one. A long-life battery may thus be provided.

Thus, for example, it comprises an aneroid capsule provided with a calibrated orifice in fluid communication with the environment of the medium in which it is desired to effect detection, said capsule being deformable under the action of a variation in the pressure of said environment.

Advantageously, an electronic measuring or detecting device is provided which cooperates with said capsule in such a way that the deformations thus produced allow actuation of said electronic device. Said electronic device may be, for example, a threshold detector, calibrated in such a way as to transmit an electrical signal when a pre-established minimum threshold for deformation of the membrane is reached. According to one example of embodiment, said electronic device is a transducer allowing generation of an electrical signal, the strength of which is related to the degree of deformation.

According to another advantageous example of embodiment, a mechanical measuring or detecting member is provided which cooperates with said capsule in such a way that the deformations thus produced allow actuation of said mechanical member. Said mechanical member may be, for example, a threshold detector, calibrated in such a way as to actuate a device capable of transmitting an electrical signal when a pre-established minimum threshold for deformation of the membrane is reached. According to one example of embodiment, said mechanical member cooperates with a rheostat capable of generating an electrical signal, the strength of which is related to the degree of deformation.

The set minimum threshold advantageously corresponds substantially to deformation caused by significant and rapid loss of pressure such as occurs upon blow-out of the tire which is being monitored. By way of non-limitative example, the minimum thresholds to be considered as significant, substantially sharp and sudden pressure variations may be of the order of 0.1 bar/sec., and preferably approximately 1 or 2 bar/sec. The response time is preferably less than 100 ms.

The calibrated orifice is advantageously a capillary tube. At the time of a variation in the monitored pressure, this allows the pressure inside the aneroid capsule to change substantially more slowly than that around the capsule, thereby creating a pressure differential capable of causing deformation of the capsule.

The device according to the invention is advantageously provided for mounting on a wheel; it is then advantageous to provide at least one means of transmitting data to a non-rotating part of the vehicle, in order to ensure that the signals may pass from the wheel to the vehicle. The vehicle may exhibit at least one data receiving means.

Advantageously, one polarity of the signal sent via the logic circuit corresponds to each type of pressure variation, i.e. positive or negative.

Advantageously, the value of the time interval between the pressure measurements is modulated as a function of the rate ζ of pressure variation. Thus, for example, the greater is ζ, the smaller is the time interval T.

The present invention also provides a tire comprising a pressure measuring and inflation/deflation control system for tires such as described above.

Advantageously, the blow-out detection device is moulded in a wall of the tire.

The present invention also provides a rim comprising a pressure measuring and inflation/deflation control system for tires such as described above.

The present invention also provides a method of measuring pressure and controlling inflation/deflation of tires, consisting in:

- effecting measurements of the pressure of a tire using a pressure sensor in fluid communication with the ambient pressure of the tire and capable of measuring said pressure, said measurements being performed at time intervals corresponding either to a so-called "normal" mode or to a so-called "accelerated" mode;
- monitoring the tire pressure variations liable to occur using a pressure variation detector capable of responding to a pressure variation inside the cavity of the tire;
- on the basis of the information provided by the pressure variation detector, actuating the shift from said so-called "normal" mode to said so-called "accelerated" mode, or the shift from said "accelerated" mode to said "normal" mode.

In the method according to the invention, the "accelerated" mode is preferably that in which the time interval between the measurements carried out by the pressure sensor is substantially shorter than in "normal" mode. For example, the "accelerated" mode may be that in which the time interval between the measurements effected by the pressure sensor is substantially zero.

Advantageously, when the operating mode switches from "economy" to "normal", there is provided a short transitional period of operation in "accelerated" measurement mode, which allows any abnormality in the pressure of one or more tires to be detected very rapidly, or indeed substantially instantaneously.

According to another advantageous embodiment of the measuring system or of the method according to the invention, provision is made for a warning signal to be emitted for the driver or for a signal to be sent to the driver assistance devices such as ABS or ESP if the pressure variation detector detects that a critical pressure variation threshold has been exceeded. In the event of such a scenario, the pressure variation detector signal is advantageously used alone, without necessarily proceeding to pressure measurement using the pressure sensor, in order to produce the shortest possible response time.

BRIEF DESCRIPTION OF THE DRAWINGS

Other characteristics and advantages of the invention will become apparent from a reading of the non-limiting description of the blow-out detection device according to the invention given with reference to the attached Figures, in which:

FIGS. 5a and 5b illustrate another type of pressure variation detector, comprising an aneroid capsule;

DESCRIPTION OF THE PREFERRED EMBODIMENT

Figure 4:
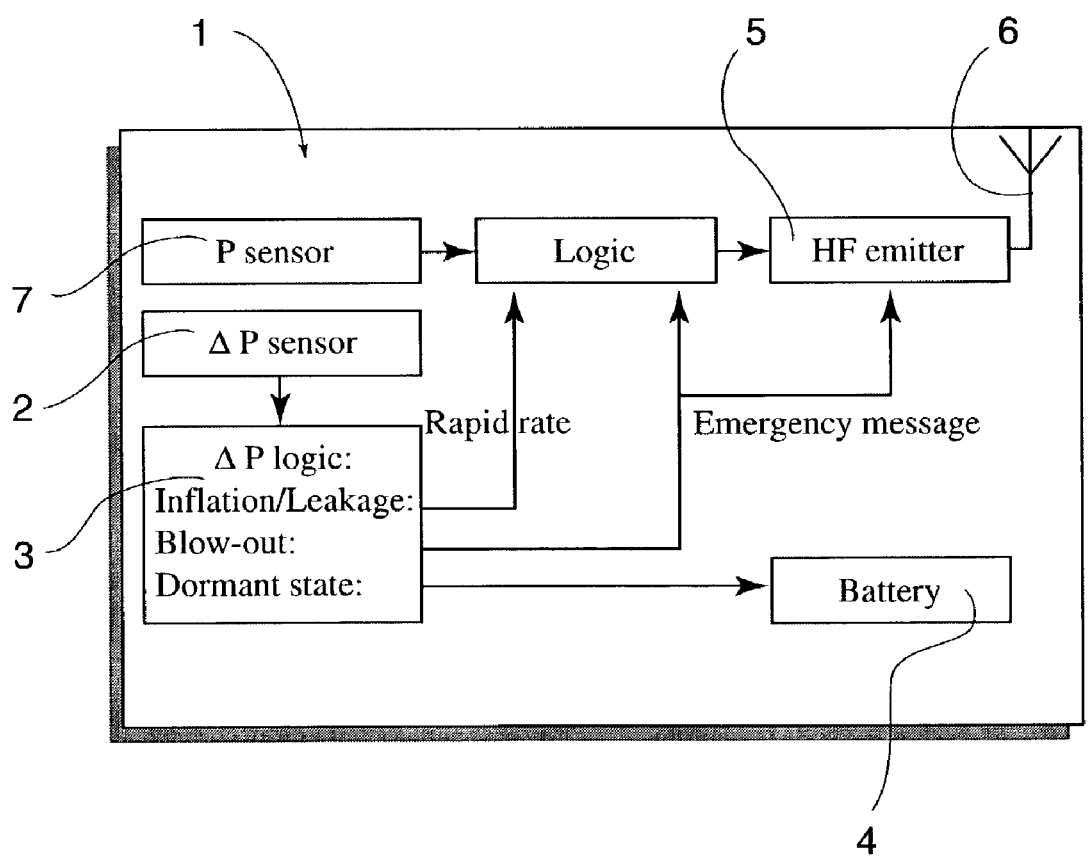
FIG. 4 illustrates a functional diagram of a pressure measuring and inflation/deflation control system for tires, according to the invention.

FIG. 4 illustrates a functional diagram of a system for monitoring the pressure of a tire 1, according to the invention. It comprises a pressure sensor 7, a pressure variation sensor 2, as described below. A management module 3 cooperating electrically or mechanically with the sensor 2 is provided. A battery 4 allows power to be supplied to the module 3 and the sensor 7, and optionally to the sensor 2, but an advantageous type of sensor 2 according to the invention does not require any power supply, which allows savings to be made with regard to the battery 4. In order to permit the transmission of data from the vehicle wheel to the vehicle, a transmission module 5 is preferably and advantageously provided. This may for example comprise an emitter (preferably High Frequency), a transponder etc. An antenna 6 may optionally complete the device of FIG. 4.

This device is provided for mounting on a wheel, either on the rim or on the tire. It may also be incorporated into one or other of these elements, such as for example moulded in a wall of the tire. For this reason, a pressure variation detector 2 is preferably used which does not require a power supply, so as to allow the battery 4 to exhibit a service life which may as far as possible match that of the tire, the wheel or the vehicle. The battery 4 is then incorporated into the device 1; it may for example be welded. In this manner, the frequent contact problems inherent in replaceable batteries are avoided.

Figure 1:
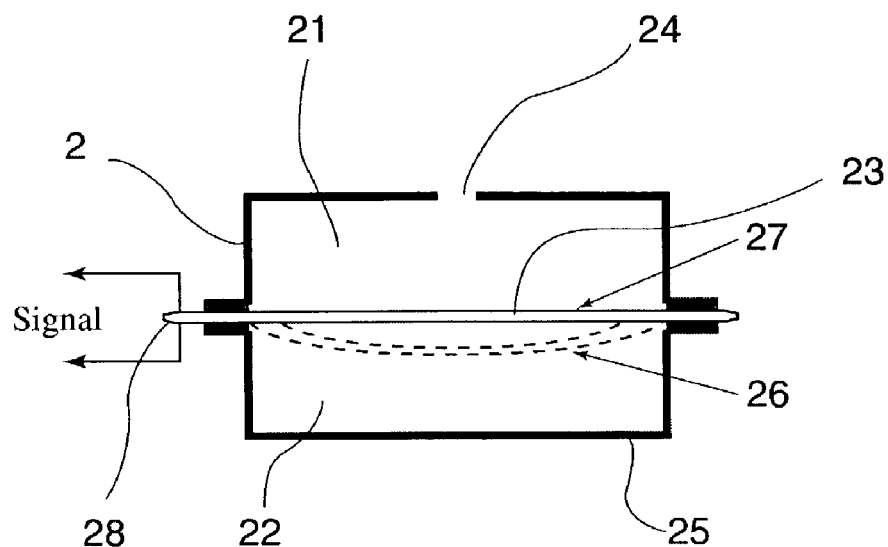
FIG. 1 is a schematic sectional view of a pressure variation sensor according to the invention.

FIG. 1 illustrates a particularly advantageous type of pressure variation detector 2, of the piezoelectric type. This comprises a casing 25, provided with two chambers 21 and 22, separated and substantially insulated from one another by a piezoelectric type membrane 23. An opening 24 allows a fluid communication to be established between a first chamber 21 of the detector and the medium or environment which it is wished to monitor. The chamber 22 is subject to a reference pressure, or is even pressure-less or under a vacuum. An electrical output 28 allows transmission of the weak current signal generated during any deformation of the membrane 23.

If the chamber 22 is under a vacuum, the membrane 23 generally displays concave deformation; it is pushed towards the chamber 22 under vacuum. All additional pressure stemming from the orifice 24 will contribute to deformation of the membrane 23, which will occupy a stabilized position such as for example 26. Any drop in pressure in the control chamber 21 entails fresh deformation of the membrane 23, which then tends to resume its original (substantially flat) shape or profile 27. In the event of a variation in the curvature of the membrane 23, a weak current is emitted, as a function of the amplitude and/or speed of deformation. Thus a blow-out in the tire connected to the chamber 21 by the orifice 24 entails a significant sharp drop in the pressure in the chamber 21. Deformation of the membrane 23 from a first stabilized profile to a second stabilized profile allows generation of a current by the electrical output 28. This current may thereafter be received by a management module 3 and processed appropriately.

FIGS. 5a and 5b illustrate another type of pressure variation detector 2, comprising an aneroid capsule 30. Said capsule may consist of two scallop-shaped faces 33, joined at their respective edges to form a closed, substantially hermetic casing. A calibrated opening 31, such as for example a capillary tube, is provided, either at the junction of the faces or elsewhere on the capsule. The shape of the capsule may vary, without going beyond the scope of the present invention.

The capsule 30 is arranged in such a way as to actuate a device allowing the information associated with deformation of the capsule to be transformed into information corresponding, for example, to information relating to a dangerous level of pressure loss, or a blow-out etc. To this end, the capsule may actuate either a mechanical member 34, such as a lever, an arm or the like, an electrical or electronic device 35, such as a variable resistor, or an electromagnetic device, such as a switch. The device in question is advantageously connected to a management module 3, which receives and processes the signal appropriately.

Figure 2:
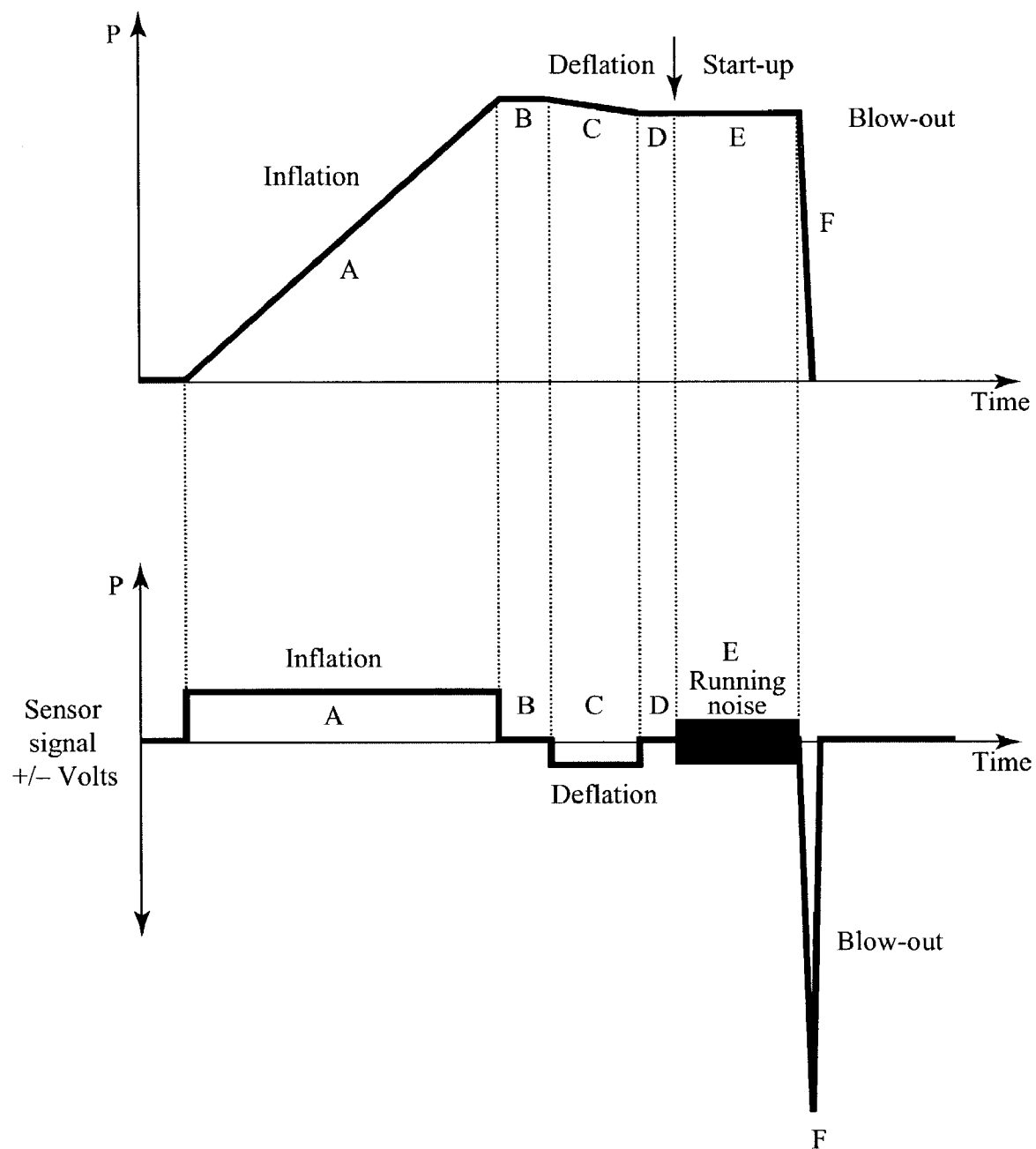
FIG. 2 shows a diagram illustrating examples of signals associated with certain types of pressure variation liable to occur in vehicle tires.

FIG. 2 illustrates examples of signals capable of being generated by a pressure variation detector 2 according to the invention. The Figure shows the relationship between the physical phenomenon present and the corresponding signal of the detector. For example, in inflation mode A, the pressure increases, i.e., changes. This causes the generation of a signal which may for example be positive and constant and is associated with a slight, continuous and regular pressure variation.

At a constant pressure, at B and D, no signal is generated since the membrane remains fixed and does not change in profile.

In the event of a decrease in pressure, at C, a signal which may for example be negative and constant may be associated with a slight, constant and regular pressure reduction.

At F, the tire bursts or suffers very significant and rapid loss of pressure, allowing the generation of a signal in the form of a "spike", of short duration, since the membrane of the sensor is severely deformed for a very short period, the period required to pass from a first substantially stabilised profile to another substantially stabilized profile.

At E, the pressure is stable and the vehicle moves. The running noise may be picked up by the sensor, depending on its sensitivity. It then functions as a noise detector or sensor or microphone. This dual function as pressure variation detector/running noise detector is particularly advantageous. For example, this dual function allows a warning signal to be linked with a running or stop mode. The signal may then be processed differently, the first of these two instances being more critical.

Figure 3:
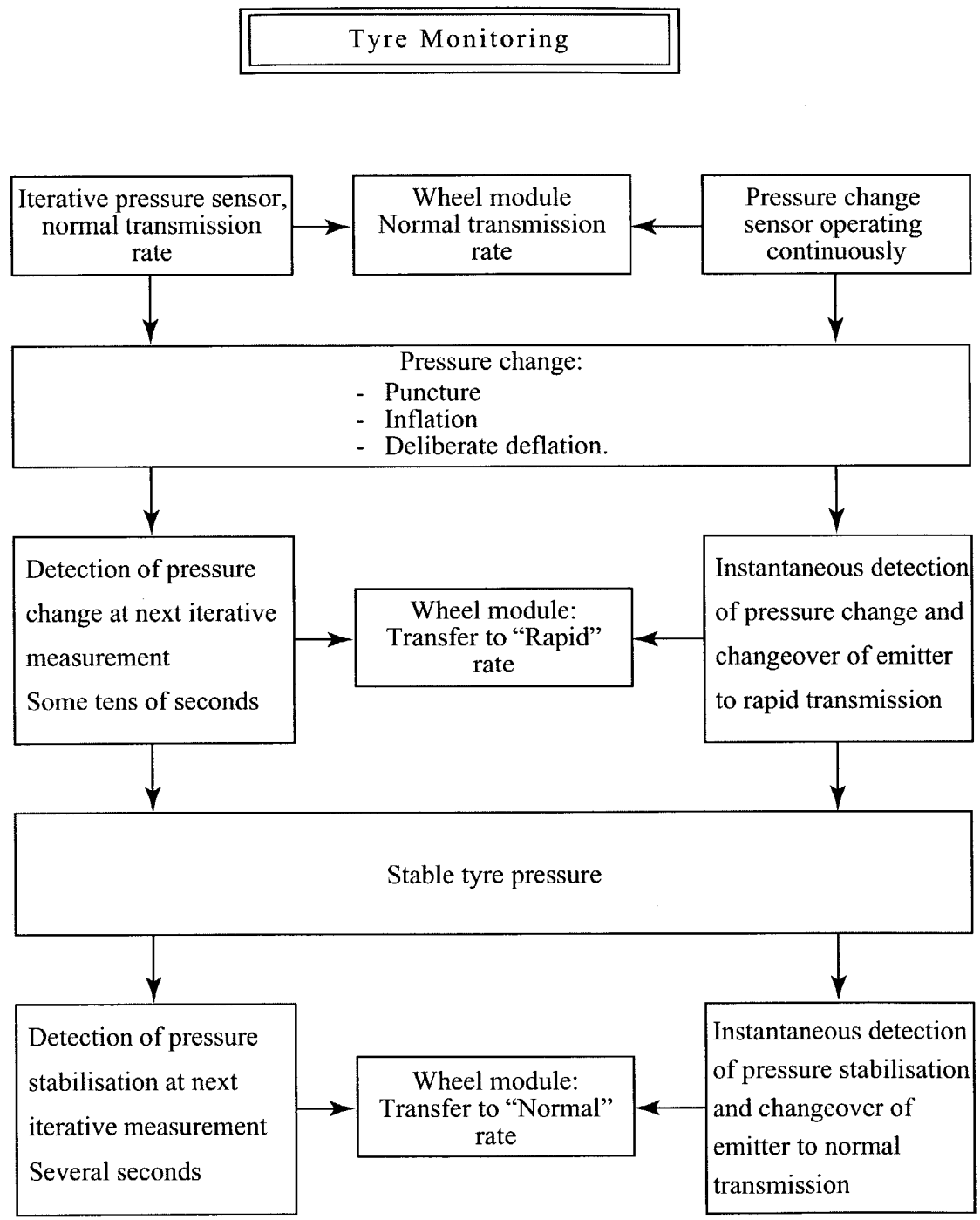
FIG. 3 shows a comparative flowchart for monitoring a tire with, on the one hand, on the left-hand side in the diagram, a conventional pressure sensor and, on the other hand, in the right-hand portion of the diagram, a pressure variation detector according to the invention.
Figure 6:
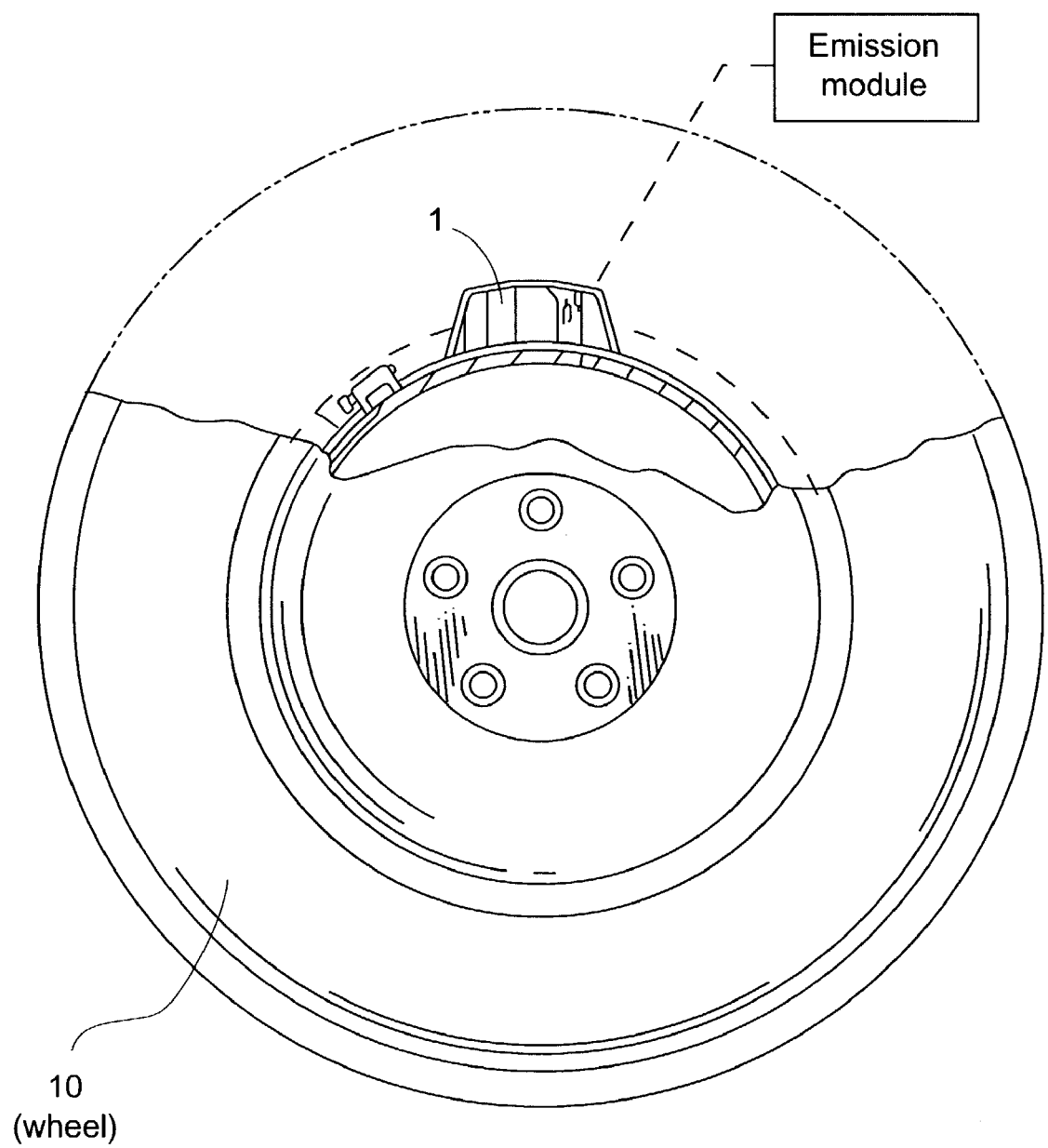
FIG. 6 illustrates a functional diagram of an implanted pressure measuring and inflation/deflation control system for tires, according to the invention.

FIG. 3 shows a working diagram of the tire monitoring method, using a pressure monitoring system according to the invention. In normal functioning mode, the measurements made by the pressure sensor 7 are effected iteratively, at given time intervals.

In order to extend the service life of the battery to the maximum possible extent, it is desirable to reduce the number of iterations for a given period, as soon as it is no longer necessary to monitor the tires continuously, typically in the event of stoppage of the vehicle, in particular for a prolonged stop.

Operation of the pressure measuring and inflation/deflation control system for tires according to the invention is as follows:

First of all, a first type of environment, and thus of utilisation, is provided, as follows: according to this first aspect, the monitoring system allows simple, safe and effective inflation of one or more tires installed on a vehicle. In such a case, the driver may stop his/her vehicle at an inflation station. He or she inflates one or more tires of the vehicle. The measurement and management system assists him/her in effecting inflation, taking account as precisely as possible of the prescribed pressures: in the event of a pressure variation, the pressure variation detection system (comprising a pressure variation sensor) detects almost instantaneously the variation in state and actuates a shift from the "normal" measuring mode, in which measurements are effected at spaced time intervals of the order of 30 to 60 seconds or even more, to a "continuous measurement" mode, in which measurements are effected at very short time intervals, such as of 1 or 2 seconds or even less.

As soon as the pressure reaches the required or prescribed level, the system may generate a signal warning that the required pressure level has been reached (for example the system actuates the alarm optionally with a distinctive audio signal peculiar to this type of operation). The operator then knows that he/she must stop the operation of inflating the particular tire. It is thus imperative for the measurement system to respond very rapidly, if it is wished to avoid over-inflation of the tire.

On the other hand, another type of environment and thus of utilization is provided, as follows: certain private cars, commercial vehicles and the like are equipped with a centralised inflation system, mounted on the vehicle and provided for adjusting the pressure level in real time, for example as a function of the utilization conditions of the vehicle, such as load, speed (at high speed it may prove advantageous to increase the pressure), or as a function of road conditions or quality (for example, in the presence of mud or snow it is advantageous to decrease the pressure to increase grip). The pressure variation may be actuated either manually or automatically.

Let us suppose a change in the driving conditions of the vehicle which necessitates a variation in inflation pressure. A compressor, mounted on the vehicle, transmits the pressurised air via the wheel hubs. In the event of actuation of a pressure reduction, a servo valve releases some of the air from the tire. The levels to which pressure is increased or reduced are monitored by the pressure measurement and management system. In the event of a variation in pressure level, any variation is immediately detected by the measurement and management system, via the pressure variation detector.

Thus, in the event of a pressure variation, the pressure variation detection system (comprising a pressure variation sensor) detects almost instantaneously the variation in state and actuates a shift from the "normal" measurement mode, in which measurements are effected at spaced time intervals of the order of 30 to 60 seconds or even more, to a "continuous measurement" mode, in which measurements are effected at very short time intervals, such as of 1 or 2 seconds or even less.

As soon as the pressure reaches the required level, the measurement and management system immediately causes inflation or deflation to stop, as appropriate. In this case too, it is thus imperative for the measurement system to respond very rapidly, if it is wished to avoid inflating or deflating the tire excessively.

The invention claimed is:

1. A pressure measuring and inflation/deflation control system for tires, comprising: a pressure sensor in fluid communication with the ambient pressure of the tire and capable of measuring this pressure; a pressure variation detector hardware device capable of responding in real time to a variation in pressure inside the cavity of the tire; a management module, capable of receiving and processing informations provided by the pressure sensor on the one hand and on the other hand by the pressure variation detector and capable, on the basis of the information provided by the pressure variation detector, of actuating the shift from a so-called "normal" pressure measuring mode to a so-called "accelerated" measuring mode, or the shift from the "accelerated" mode to the "normal" mode.

2. A pressure measuring and inflation/deflation control system for tires according to claim 1, in which the "accelerated" mode is that in which the time interval between the measurements carried out by the pressure sensor is substantially shorter than in "normal" mode.

3. A pressure measuring and inflation/deflation control system for tires according to claim 2, in which the "accelerated" mode is that in which the time interval between the measurements carried out by the pressure sensor is substantially zero.

4. A pressure measuring and inflation/deflation control system for tires according to claim 1, in which the pressure variation detector is capable of providing a signal relating to the rate $\zeta$ of pressure variation in the cavity of the tire.

5. A pressure measuring and inflation/deflation control system for tires according to claim 1, in which the pressure variation detector is of the piezoelectric type.

6. A pressure measuring and inflation/deflation control system for tires according to claim 5, in which the pressure variation detector comprises a casing provided with two chambers, insulated substantially from one another and separated by a piezoelectric type deformable membrane, a first chamber being subject to a reference pressure and the second being capable of being in fluid communication with the environment of the medium in which it is desired to effect monitoring, said deformable membrane adopting a given, substantially stable profile in the absence of a variation in the pressure differential between the two chambers, said membrane being adapted to become deformed so as to pass from a first profile to a second profile under the action of a pressure variation in said environment, the deformations thus produced allowing the generation of an electrical signal, the strength of which is related to the degree of deformation.

7. A pressure measuring and inflation/deflation control system for tires according to claim 6, in which the reference pressure corresponds to a vacuum.

8. A pressure measuring and inflation/deflation control system for tires according to claim 1, in which the environment of the medium in which it is wished to perform monitoring corresponds to the pressure inside the cavity of the tire.

9. A pressure measuring and inflation/deflation control system for tires according to claim 1, in which the pressure variation detector is of the aneroid type.

10. A pressure measuring and inflation/deflation control system for tires according to claim 9, in which the pressure variation detector comprises an aneroid capsule provided with a calibrated orifice in fluid communication with the environment of the medium in which it is desired to effect detection, said capsule being deformable under the action of a variation in the pressure of said environment.

11. A pressure measuring and inflation/deflation control system for tires according to claim 10, in which an electronic measuring or detecting device cooperates with said capsule in such a way that the deformations thus produced allow actuation of said electronic device.

12. A pressure measuring and inflation/deflation control system for tires according to claim 11, in which said electronic device is a threshold detector, calibrated in such a way as to transmit an electrical signal when a pre-established minimum threshold for deformation of the membrane is reached.

13. pressure measuring and inflation/deflation control system for tires according to claim 11, in which said electronic device is a transducer allowing generation of an electrical signal, the strength of which is related to the degree of deformation.

14. A pressure measuring and inflation/deflation control system for tires according to claim 10, in which a mechanical measuring or detecting member cooperates with said capsule in such a way that the deformations thus produced allow actuation of said mechanical member.

15. A pressure measuring and inflation/deflation control system for tires according to claim 14, in which said mechanical member is a threshold detector, calibrated in such a way as to transmit an electrical signal when a pre-established minimum threshold for deformation of the membrane is reached.

16. A pressure measuring and inflation/deflation control system for tires according to claim 14, in which said mechanical member cooperates with a rheostat capable of generating an electrical signal, the strength of which is related to the degree of deformation.

17. A pressure measuring and inflation/deflation control system for tires according to claim 10, in which the calibrated orifice is a capillary tube.

18. A pressure measuring and inflation/deflation control system for tires according to of claim 1, also comprising an information transmission module capable of transmitting information from a rotating part to a fixed part of the vehicle.

19. A pressure measuring and inflation/deflation control system for tires according to claim 1, comprising, for the non-rotating part of the vehicle, at least one data receiving means.

20. A tire comprising a pressure measuring and inflation/deflation control system for tires according to claim 1.

21. A tire according to claim 20, in which the pressure measuring and inflation/deflation control for tires is arranged in a wall.

22. A rim comprising a pressure measuring and inflation/deflation control system for tires according to claim 1.

23. A pressure measuring and inflation/deflation control system for tires according to claim 1, comprising at least one means of transmitting data to a non-rotating part of the vehicle.

24. A method of measuring pressure and controlling inflation/deflation of tires, consisting in: effecting measurements of the pressure of a tire using a pressure sensor in fluid communication with the ambient pressure of the tire and capable of measuring said pressure, said measurements being performed at time intervals corresponding either to a so-called "normal" measuring mode or a so-called "accelerated" measuring mode; monitoring the tire pressure variations liable to occur using a pressure variation detector hardware device capable of responding in real time to a pressure variation inside the cavity of the tire; on the basis of the information provided by the pressure variation detector, actuating the shift from said so-called "normal" pressure measuring mode to said so-called "accelerated" measuring mode, or the shift from said "accelerated" mode to said "normal" mode.

25. method of measuring pressure and controlling inflation/deflation of tires, according to claim 24, in which the "accelerated" mode is that in which the time interval between the measurements carried out by the pressure sensor is substantially shorter than in "normal" mode.

26. A method of measuring pressure and controlling inflation/deflation of tires, according to claim 25, in which the "accelerated" mode is that in which the time interval between the measurements carried out by the pressure sensor is substantially zero.

* * * * *